US010738666B2

(12) United States Patent
Okazawa (10) Patent No.: US 10,738,666 B2
(45) Date of Patent: Aug. 11, 2020

(54) CONTROL SYSTEM FOR OIL SUPPLY MECHANISM

(71) Applicant: TOYOTA JIDOSHA KABUSHIKI KAISHA, Toyota-shi, Aichi-ken (JP)

(72) Inventor: Shingo Okazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/570,383

(22) Filed: Sep. 13, 2019

(65) Prior Publication Data

US 2020/0131956 A1 Apr. 30, 2020

(30) Foreign Application Priority Data

Oct. 29, 2018 (JP) .................. 2018-202871

(51) Int. Cl.
 *F01M 1/20* (2006.01)
 *F04C 2/10* (2006.01)
 *F01M 1/16* (2006.01)
 *F16H 55/17* (2006.01)
 *F16H 57/04* (2010.01)

(52) U.S. Cl.
 CPC ............ *F01M 1/20* (2013.01); *F01M 1/16* (2013.01); *F04C 2/10* (2013.01); *F16H 55/171* (2013.01); *F16H 57/0489* (2013.01)

(58) Field of Classification Search
 CPC .... F01M 1/16; F01M 1/20; F04C 2/10; F16H 55/171; F16H 57/0489; F01L 1/024; F01L 1/3442; F01L 2001/0537; Y02T 10/18; F02D 2041/001
 See application file for complete search history.

(56) References Cited

U.S. PATENT DOCUMENTS

| | | | | |
|---|---|---|---|---|
| 2001/0020458 | A1* | 9/2001 | Mikame | F02D 41/221 123/90.15 |
| 2005/0257762 | A1* | 11/2005 | Sawada | F01L 1/3442 123/90.17 |
| 2015/0377375 | A1* | 12/2015 | Takagi | F16K 31/0613 137/242 |
| 2017/0138275 | A1* | 5/2017 | Takagi | F01M 1/16 |
| 2017/0217439 | A1* | 8/2017 | Mizuno | F04C 14/24 |
| 2018/0149263 | A1* | 5/2018 | Nagasato | F16H 57/0436 |
| 2020/0079345 | A1* | 3/2020 | Nozaki | F16H 61/662 |

FOREIGN PATENT DOCUMENTS

| | | |
|---|---|---|
| JP | H02-001407 U | 1/1990 |
| JP | 2013-204444 A | 10/2013 |

* cited by examiner

*Primary Examiner* — Orlando Bousono
(74) *Attorney, Agent, or Firm* — Oliff PLC (57) ABSTRACT

A control system for an oil supply mechanism includes an oil pump, a hydraulic pressure sensor, a drive shaft, a pump pulley, a toothed belt, and an output shaft. An electronic control unit included by the control system detects an abnormality of the toothed belt based on a comparison result between an actual value and a theoretical value that are frequencies of pressure pulsations of oil. The actual value is a value calculated based on time fluctuations of a hydraulic pressure detected by the hydraulic pressure sensor. The theoretical value is a value calculated based on a rotational speed of the output shaft and the number of teeth of an inner rotor.

9 Claims, 3 Drawing Sheets

CONTROL SYSTEM FOR OIL SUPPLY MECHANISM

CROSS-REFERENCE TO RELATED APPLICATIONS

This application claims priority to Japanese Patent Application No. 2018-202871 filed on Oct. 29, 2018, which is incorporated herein by reference in its entirety.

BACKGROUND

1. Technical Field

This disclosure relates to a control system for an oil supply mechanism.

2. Description of Related Art

In an internal combustion engine described in Japanese Unexamined Utility Model Application Publication No. 02-001407 (JP 02-001407 U), an oil pan in which oil is accumulated is fixed to a bottom end of a cylinder block. An oil pump configured to pump the oil to various parts of the internal combustion engine is accommodated inside the oil pan. An external-gear-type pulley is attached to a drive shaft of the oil pump. A toothed belt is wound around the pulley. Teeth meshing with teeth of the pulley project from an inner peripheral surface of the toothed belt. Power of a crankshaft is transmitted to the toothed belt. When the toothed belt rotates, the oil pump is driven.

SUMMARY

In the toothed belt, a tooth breakage might occur due to deterioration, for example. The internal combustion engine described in JP 02-001407 U does not consider detection of a tooth breakage at all. Accordingly, a technology that can detect a tooth breakage of a toothed belt is desired.

One aspect of the disclosure relates to a control system for an oil supply mechanism including an oil pump, a hydraulic pressure sensor, a drive shaft, a pump pulley, a toothed belt, and an output shaft. The oil pump is configured to discharge oil by rotational motions of an external-gear-type inner rotor and an internal-gear-type outer rotor driven by meshing with teeth of the inner rotor. The hydraulic pressure sensor is configured to detect a hydraulic pressure of the oil discharged from the oil pump. The drive shaft is connected to a rotation center of the inner rotor. The external-gear-type pump pulley is attached to the drive shaft. The toothed belt is wound around the pump pulley and is configured such that teeth meshing with teeth of the pump pulley project from an inner peripheral surface of the toothed belt. The output shaft is configured such that the toothed belt is wound around the output shaft, and the output shaft is configured to rotate the toothed belt. The control system includes an electronic control unit. The electronic control unit is configured to detect an abnormality of the toothed belt based on a comparison result between an actual value and a theoretical value that are frequencies of pressure pulsations of the oil. The actual value is calculated based on time fluctuations of the hydraulic pressure detected by the hydraulic pressure sensor. The theoretical value is calculated based on a rotational speed of the output shaft and the number of the teeth of the inner rotor.

In a so-called trochoid-type oil pump, pressure pulsations occur in the oil along with the discharge of the oil. Here, when the toothed belt has a tooth breakage, the toothed belt races, so that power of the toothed belt does not reach the oil pump and the oil is not discharged from the oil pump. Accordingly, when the toothed belt has a tooth breakage, the actual value for the frequency of pressure pulsations of the oil deviates from the theoretical value. In view of this, with the configuration of the control system of the above aspect, the tooth breakage of the toothed belt can be detected by comparing the actual value for the frequency of pressure pulsations of the oil with the theoretical value.

In the control system according to the aspect of the disclosure, the electronic control unit may be configured to determine the abnormality based on whether or not the actual value falls within a range between a maximum value that is larger than the theoretical value only by a predetermined allowable value and a minimum value that is smaller than the theoretical value only by the predetermined allowable value.

In the configuration of the control system, the predetermined allowable value is set to a value corresponding to 5% of the theoretical value, for example. Hereby, by determining whether or not the actual value of the frequency of pressure pulsations of the oil falls within a range of the theoretical value based on the predetermined allowable value, the tooth breakage of the toothed belt can be detected.

In the control system according to the aspect of the disclosure, when a peak time is a time when the hydraulic pressure shifts from increase to decrease or a peak time is a time when the hydraulic pressure shifts from decrease to increase in a time series of the time fluctuations of the hydraulic pressure detected by the hydraulic pressure sensor, the electronic control unit may be configured to calculate the actual value based on a time interval between the peak time and another peak time adjacent to the peak time.

In the configuration of the control system, the frequency of pressure pulsations of the oil is calculated based on two adjacent peak times of the hydraulic pressure in the time series of the time fluctuations of the hydraulic pressure. Accordingly, if the toothed belt has a tooth breakage, the actual value for the frequency of pressure pulsations of the oil greatly changes from the theoretical value. On this account, a difference between the actual value and the theoretical value becomes large, thereby making it possible to more surely detect a tooth breakage of the toothed belt.

In the control system according to the aspect of the disclosure, when a first peak time is a time when the hydraulic pressure shifts from increase to decrease and a second peak time is a time when the hydraulic pressure shifts from decrease to increase in a time series of the time fluctuations of the hydraulic pressure detected by the hydraulic pressure sensor, the electronic control unit may be configured to calculate the actual value based on a time interval between the first peak time and the second peak time adjacent to each other.

In the configuration of the control system, the electronic control unit calculates a frequency of pressure pulsations of the oil based on a time interval between the first peak time and the second peak time adjacent to each other in the time series of the time fluctuations of the hydraulic pressure. Accordingly, if the toothed belt has a tooth breakage, the actual value for the frequency of pressure pulsations of the oil greatly changes from the theoretical value. On this account, a difference between the actual value and the theoretical value becomes large, thereby making it possible to more surely detect the tooth breakage of the toothed belt.

The control system according to the aspect of the disclosure, the electronic control unit may be configured to calculate the actual value after filtering is performed to remove fluctuations of frequencies higher than the theoretical value in a time series of the time fluctuations of the hydraulic pressure detected by the hydraulic pressure sensor.

A fluctuation within a period shorter than a pressure pulsation of the oil may be mixed as a noise in the time series of the time fluctuations of the hydraulic pressure.

Accordingly, when a peak of the hydraulic pressure is specified in the time series in which such a fluctuation is mixed, a peak different from a peak caused due to a pressure pulsation of the oil might be specified as the peak caused due to the pressure pulsation of the oil. In this regard, in the configuration of the control system, the frequency of pressure pulsations of the oil is calculated after the fluctuation within the period shorter than the pressure pulsation of the oil is removed from the time series of the time fluctuations of the hydraulic pressure. Accordingly, it is possible to prevent such a situation that a peak different from a peak caused due to a pressure pulsation of the oil is specified by mistake as the peak caused due to the pressure pulsation of the oil.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
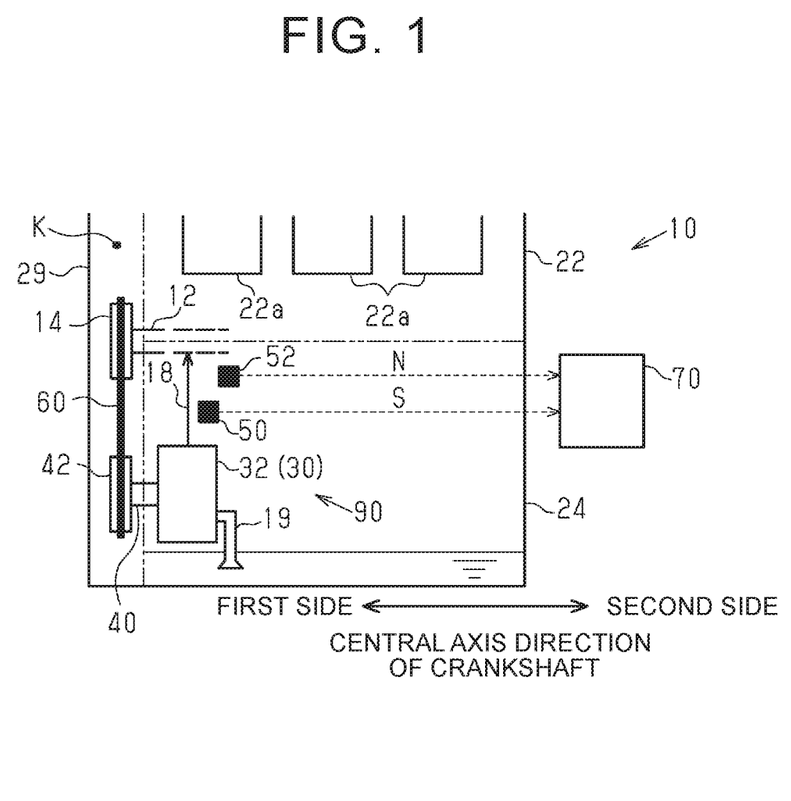
FIG. 1 is a schematic view of an internal combustion engine including an oil supply mechanism.

With reference to the accompanying drawings, a description is now made of one embodiment of a control system for an oil supply mechanism. As illustrated in FIG. 1, an internal combustion engine 10 includes a cylinder block 22 having a generally rectangular-solid shape as a whole. Inside the cylinder block 22, a plurality of (three, in the present embodiment) cylinders 22a for burning fuel is sectioned. A box-shaped oil pan 24 is fixed to a bottom end surface of the cylinder block 22. Oil is accumulated in the bottom of the oil pan 24.

A crankshaft 12 is disposed between the cylinder block 22 and the oil pan 24. The crankshaft 12 extends in one direction (the right-left direction in FIG. 1) as a whole. The crankshaft 12 is supported rotatably between the bottom end surface of the cylinder block 22 and a crank cap attached to the cylinder block 22. A part of the crankshaft 12 on a first side in its central axis direction penetrates through side walls of the cylinder block 22 and the oil pan 24 so as to project outwardly from the cylinder block 22 and the oil pan 24. Note that, in FIG. 1, only the part of the crankshaft 12 on the first side in the central axis direction is illustrated, and a most part of the crankshaft 12 on a second side in the central axis direction is omitted. In the vicinity of the crankshaft 12, a crank angle sensor 52 configured to detect a crank angle N that is a rotational position of the crankshaft 12 is disposed.

Side faces of the cylinder block 22 and the oil pan 24 on the first side in the central axis direction of the crankshaft 12 are covered with a chain case 29 having a long body in the up-down direction. A chain chamber K in which a toothed belt 60 (described later) and so on are to be accommodated is sectioned between the chain case 29 and each of the cylinder block 22 and the oil pan 24.

Figure 2:
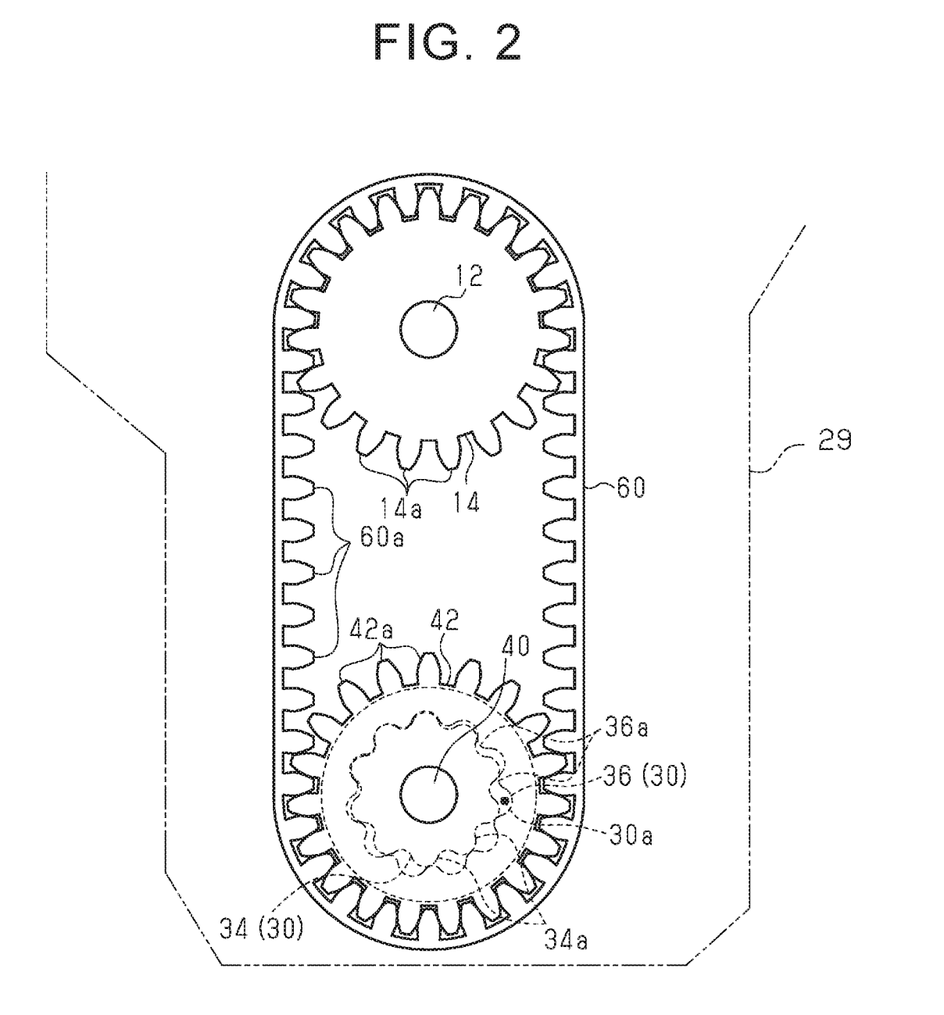
FIG. 2 is a plan view of the internal combustion engine viewed from a first side in the central axis direction of a crankshaft.

An oil supply mechanism 90 is provided in the internal combustion engine 10. The oil supply mechanism 90 includes an oil pump 30 configured to pump oil to various parts of the internal combustion engine 10. The oil pump 30 is accommodated inside the oil pan 24. The oil pump 30 is a trochoid-type (inscribed-gear-type) pump. That is, as illustrated in FIGS. 1 and 2, a substantially annular internal-gear-type outer rotor 36 is disposed inside a housing 32 of the oil pump 30. As illustrated in FIG. 2, 11 teeth 36a are provided at regular intervals in the circumferential direction on the inner periphery of the outer rotor 36. Although detailed illustrations are omitted, the outer periphery of the outer rotor 36 makes internal contact with a wall surface of the housing 32. That is, the outer rotor 36 is accommodated in the housing 32 so as to rotate around the central axis of the outer rotor 36. Note that, in FIG. 2, a reference sign is assigned only to some of the teeth 36a of the outer rotor 36.

A substantially annular external-gear-type inner rotor 34 is disposed radially inwardly from the outer rotor 36. Ten teeth 34a are provided at regular intervals in the circumferential direction on the outer periphery of the inner rotor 34. That is, the number of the teeth 34a of the inner rotor 34 is smaller by one than the number of the teeth 36a of the outer rotor 36. Note that, in FIG. 2, a reference sign is assigned only to some of the teeth 34a of the inner rotor 34. The inner rotor 34 is disposed such that the central axis of the inner rotor 34 is eccentric to the central axis of the outer rotor 36. Among the teeth 34a of the inner rotor 34, the teeth 34a on the side where the inner rotor 34 is eccentric to the outer rotor 36 mesh with the teeth 36a of the outer rotor 36. In the meantime, among the teeth 34a of the inner rotor 34, the teeth 34a on the side opposite from the side where the inner rotor 34 is eccentric to the outer rotor 36 are disposed with a gap from the teeth 36a of the outer rotor 36. This gap serves as an oil holding chamber 30a in which oil is held.

In the oil pump 30, when the inner rotor 34 rotates, the outer rotor 36 is driven to rotate due to meshing with the teeth 34a of the inner rotor 34. The volume of the oil holding chamber 30a changes along with the rotation of the inner rotor 34 and the outer rotor 36, so that the oil is taken into the oil holding chamber 30a or the oil is discharged from the oil holding chamber 30a.

Although detailed illustrations are omitted, a supply passage via which the oil is supplied to the oil holding chamber 30a is sectioned inside the housing 32. As illustrated in FIG. 1, a strainer 19 configured to guide the oil from the bottom of the oil pan 24 to the supply passage in the housing 32 is connected to the housing 32. Further, an oil flow passage 18 connected to various parts (e.g., a main gallery of the cylinder block 22), in the internal combustion engine 10, to which lubrication is required is connected to the housing 32. The oil discharged from the oil pump 30 is supplied to those various parts of the internal combustion engine 10 via the oil flow passage 18. In the middle of the oil flow passage 18, a hydraulic pressure sensor 50 configured to detect a hydraulic pressure S of the oil discharged from the oil pump 30 is disposed.

As illustrated in FIG. 2, a drive shaft 40 is passed through a central hole of the annular inner rotor 34. That is, the drive shaft 40 is connected to the rotation center of the inner rotor 34. The drive shaft 40 is fixed to the inner rotor 34 and rotates together in an integrated manner with the inner rotor 34. As illustrated in FIG. 1, the drive shaft 40 is placed in parallel with the central axis of the crankshaft 12. The drive shaft 40 projects toward the first side in the central axis direction of the crankshaft 12 from the housing 32 of the oil pump 30. A part of the drive shaft 40 on the first side in the central axis direction of the crankshaft 12 penetrates through the side wall of the oil pan 24 so as to project outwardly from the oil pan 24.

A substantially annular external-gear-type pump pulley 42 is attached to the part, of the drive shaft 40, projecting outwardly from the oil pan 24. The pump pulley 42 is placed inside the chain chamber K. As illustrated in FIG. 2, a plurality of teeth 42a is provided at regular intervals in the circumferential direction on the outer periphery of the pump pulley 42. The pump pulley 42 is fixed to the drive shaft 40 and rotates together in an integrated manner with the drive shaft 40. Note that, in FIG. 2, a reference sign is assigned only to some of the teeth 42a of the pump pulley 42.

As illustrated in FIG. 1, an external-gear-type crank pulley 14 is attached to a part, of the crankshaft 12, that projects outwardly from the cylinder block 22 and the oil pan 24. The crank pulley 14 is placed inside the chain chamber K. More specifically, the crank pulley 14 is disposed at the same position as the pump pulley 42 in terms of the central axis direction of the crankshaft 12. As illustrated in FIG. 2, a plurality of teeth 14a is provided at regular intervals in the circumferential direction on the outer periphery of the crank pulley 14. The number of the teeth 14a of the crank pulley 14 is the same as the number of the teeth 42a of the pump pulley 42. Further, the diameter of the addendum circle of the crank pulley 14 is the same as the diameter of the addendum circle of the pump pulley 42. The crank pulley 14 is fixed to the crankshaft 12 and rotates together in an integrated manner with the crankshaft 12. Note that, in FIG. 2, a reference sign is assigned only to some of the teeth 14a of the crank pulley 14.

An endless (circular) toothed belt 60 is wound around the pump pulley 42 and the crank pulley 14. Teeth 60a meshing with the teeth 42a of the pump pulley 42 and the teeth 14a of the crank pulley 14 project from an inner peripheral surface of the toothed belt 60. The teeth 60a are provided at regular intervals throughout the toothed belt 60 in its rotation direction. A driving force of the crankshaft 12 is transmitted to the toothed belt 60 via the crank pulley 14. As a result, the toothed belt 60 rotates around the pump pulley 42 and the crank pulley 14 so as to rotate the pump pulley 42. As such, in the present embodiment, the crankshaft 12 serves as an output shaft configured to rotate the toothed belt 60. Note that, in FIG. 2, a reference sign is assigned only to some of the teeth 60a of the toothed belt 60.

As described above, the oil supply mechanism 90 includes the oil pump 30, the strainer 19, the oil flow passage 18, the drive shaft 40, the pump pulley 42, the crankshaft 12, the crank pulley 14, the toothed belt 60, and the hydraulic pressure sensor 50.

The oil supply mechanism 90 is controlled by a control system provided in the internal combustion engine 10. The control system in the present embodiment includes an electronic control unit 70 illustrated in FIG. 1. The electronic control unit 70 is a computer including a nonvolatile storage portion in which various programs (software) are stored, a volatile RAM in which data is stored temporarily at the time of executing a program, and so on. A crank angle N detected by the crank angle sensor 52 is input into the electronic control unit 70. Further, a hydraulic pressure S of the oil that is detected by the hydraulic pressure sensor 50 is input into the electronic control unit 70. The electronic control unit 70 acquires the hydraulic pressure S of the oil, input from the hydraulic pressure sensor 50, every predetermined control period, and stores the hydraulic pressure S in the storage portion as sequential data. At this time, every time the electronic control unit 70 acquires new data, the electronic control unit 70 deletes the oldest data, so that data of the hydraulic pressure S within a predetermine time range is stored. This time range is determined as a time range longer than a time necessary for the toothed belt 60 to rotate once at a minimum rotational speed Ne of the crankshaft 12 at which the driving of the internal combustion engine 10 can be independently continued (e.g., in an idle state).

The electronic control unit 70 can execute a tooth breakage detection process of detecting a tooth breakage of the toothed belt 60. Here, in the oil pump 30, a volumetric change of the oil holding chamber 30a is repeated periodically along with the rotation of the inner rotor 34 and the outer rotor 36, so that the oil is discharged periodically. Accordingly, pressure pulsations occur in the oil discharged from the oil pump 30. In the tooth breakage detection process, the electronic control unit 70 detects a tooth breakage of the toothed belt 60 by referring to frequencies (Hz) of the pressure pulsations.

More specifically, the electronic control unit 70 calculates a frequency of pressure pulsations of the oil based on time fluctuations of the hydraulic pressure S detected by the hydraulic pressure sensor 50. The electronic control unit 70 deals with the frequency calculated based on the hydraulic pressure S detected by the hydraulic pressure sensor 50 as an actual value Z1. Further, the electronic control unit 70 compares the actual value Z1 with a theoretical value Z2 that is a frequency of pressure pulsations of the oil, the frequency being calculated based on the rotational speed Ne (rpm) of the crankshaft 12 and the number D of the teeth 34a of the inner rotor 34. Then, the electronic control unit 70 detects a tooth breakage of the toothed belt 60 based on the comparison result.

Here, the following describes the theoretical value Z2 for the frequency of pressure pulsations of the oil. As described above, the toothed belt 60 is wound around the crank pulley 14 and the pump pulley 42. Accordingly, power of the crankshaft 12 is transmitted to the pump pulley 42 via the toothed belt 60. On this account, a rotational speed of the pump pulley 42 in a normal state where the toothed belt 60 does not have a tooth breakage, that is, a rotational speed of the drive shaft 40 and the inner rotor 34 is determined unambiguously in accordance with the rotational speed Ne of the crankshaft 12.

More specifically, a rotational speed Pe of the inner rotor 34 is determined by Equation (1) from the relationship between the rotational speed Ne of the crankshaft 12, a diameter Rc of the addendum circle of the crank pulley 14, and a diameter Rp of the addendum circle of the pump pulley 42.

$$Pe = Ne \times (Rc/Rp) \qquad (1)$$

Then, the theoretical value Z2 for the frequency of pressure pulsations of the oil is determined unambiguously by the rotational speed Pe of the inner rotor 34 and the number D of the teeth 34a of the inner rotor 34. That is, the theoretical value Z2 is determined by Equation (2).

$$Z2 = (Pe/60) \times D \qquad (2)$$

In the electronic control unit 70, a frequency map indicative of the relationship between the theoretical value Z2 calculated by Equation (2) and the rotational speed Ne of the crankshaft 12 is stored. In the frequency map, as apparent from Equation (2), the value of the theoretical value Z2 is larger as the rotational speed Ne of the crankshaft 12 is larger.

Next will be described more specifically the tooth breakage detection process executed by the electronic control unit 70. The electronic control unit 70 executes the tooth breakage detection process every predetermined period under the state where the internal combustion engine 10 is driven.

Figure 3:
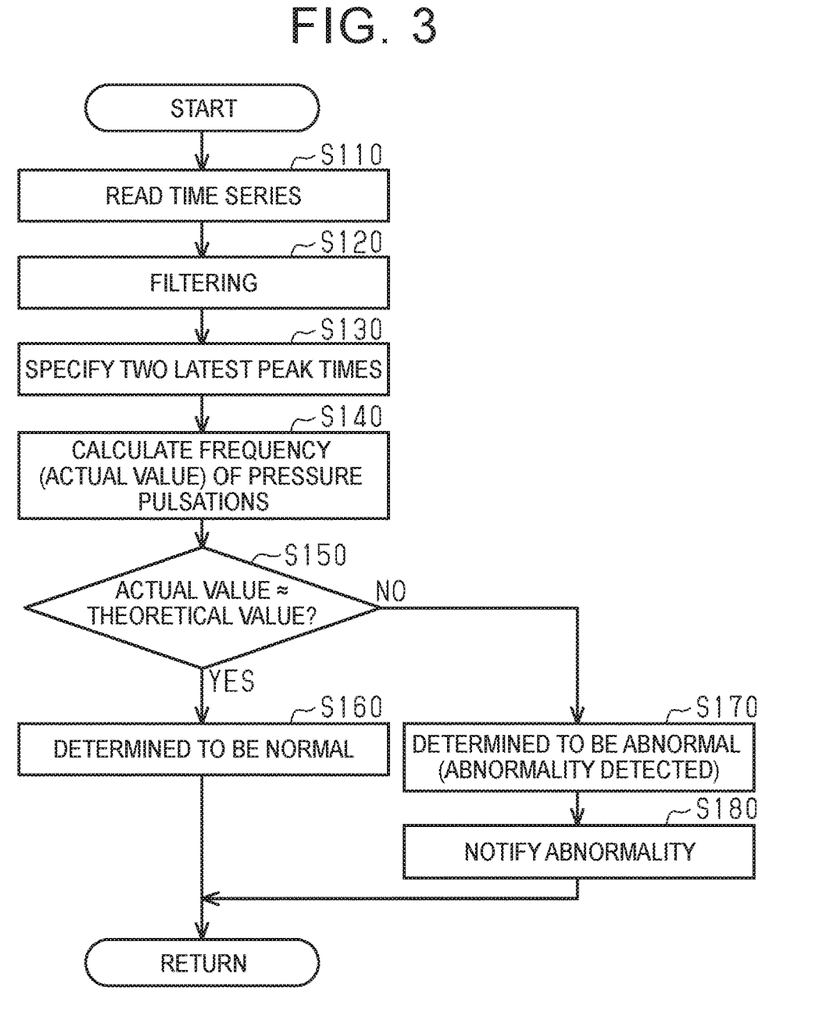
FIG. 3 is a flowchart illustrating a procedure of a tooth breakage detection process for a toothed belt of the oil supply mechanism.

As illustrated in FIG. 3, when the tooth breakage detection process starts, the electronic control unit 70 executes the process of step S110. In step S110, the electronic control unit 70 reads a time series of time fluctuations of the hydraulic pressure S, the time fluctuations being stored in the electronic control unit 70 itself. After that, the electronic control unit 70 advances the process to step S120.

In step S120, the electronic control unit 70 executes filtering to remove a specific fluctuation component in the time series of the time fluctuations of the hydraulic pressure S. Here, a fluctuation within a period shorter than a pressure pulsation of the oil may be mixed as a noise in the time series of the time fluctuations of the hydraulic pressure S. The filtering removes such a fluctuation within a short period. More specifically, the electronic control unit 70 calculates a current rotational speed Ne of the crankshaft 12 based on the crank angle N detected by the crank angle sensor 52. The electronic control unit 70 refers to the frequency map and acquires a theoretical value Z2 for a frequency of pressure pulsations of the oil, the frequency corresponding to the current rotational speed Ne of the crankshaft 12. Then, the electronic control unit 70 sets a frequency slightly higher than the acquired theoretical value Z2 as a cutoff frequency and applies a low-pass filter to the time series of the time fluctuations of the hydraulic pressure S so as to remove fluctuations of frequencies higher than the cutoff frequency. After that, the electronic control unit 70 advances the process to step S130.

In step S130, the electronic control unit 70 specifies two latest peak times from the time series of the time fluctuations of the hydraulic pressure S after the filtering. In the present embodiment, a peak time indicates a time when the hydraulic pressure S shifts from increase to decrease. Here, when a hydraulic pressure at the time when the hydraulic pressure S shifts from increase to decrease is assumed as a peak value, the electronic control unit 70 calculates an average value of all peak values in the time series of the time fluctuations of the hydraulic pressure S after the filtering. In a case where the electronic control unit 70 specifies the two latest peak times, when a peak value is lower than the average value, the electronic control unit 70 does not take, as a peak time, a timing when the peak value appears. After the process of step S130 described above, the electronic control unit 70 advances the process to step S140.

In step S140, the electronic control unit 70 calculates an inverse of a time interval between the two latest peak times. This value is an actual value Z1 for the frequency of pressure pulsations of the oil. After that, the electronic control unit 70 advances the process to step 5150.

In step S150, the electronic control unit 70 compares the actual value Z1 calculated in step S140 with the theoretical value Z2 acquired in step S120. The electronic control unit 70 determines whether or not the actual value Z1 is generally the same as the theoretical value Z2. More specifically, the electronic control unit 70 determines whether or not the actual value Z1 falls within a range between a maximum value that is larger than the theoretical value Z2 only by a predetermined allowable value and a minimum value that is smaller than the theoretical value Z2 only by the predetermined allowable value. In the present embodiment, the allowable value is a value corresponding to 5% of the theoretical value Z2.

When the actual value Z1 falls within the range between the maximum value and the minimum value (step S150: YES), the electronic control unit 70 advances the process to step S160. In step S160, the electronic control unit 70 determines that the toothed belt 60 is normal and finishes a series of processes once.

In the meantime, in step S150, when the actual value Z1 does not fall within the range between the maximum value and the minimum value (step S150: NO), the electronic control unit 70 advances the process to step S170. In step S170, the electronic control unit 70 determines that the toothed belt 60 has an abnormality. That is, the electronic control unit 70 detects the abnormality of the toothed belt 60. After that, the electronic control unit 70 advances the process to step S180.

In step S180, the electronic control unit 70 turns on a notification lamp to notify an occupant in a vehicle cabin that the toothed belt 60 has an abnormality. After that, the electronic control unit 70 finishes the series of processes once.

Figure 4:
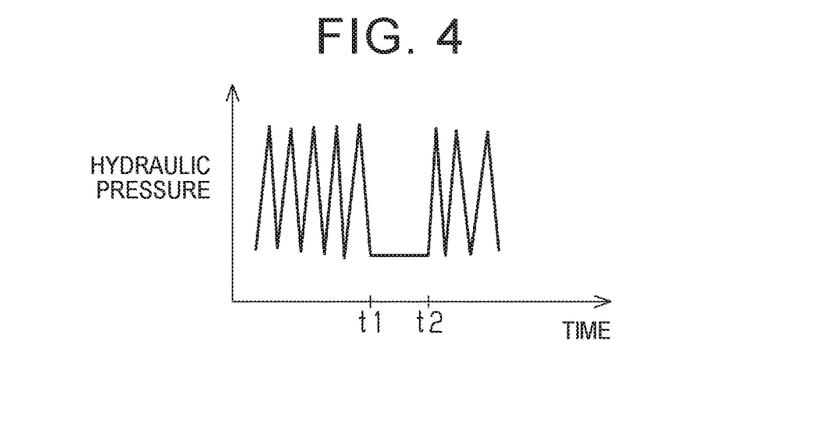
FIG. 4 is a time chart illustrating an example of time fluctuations of a hydraulic pressure in the internal combustion engine.

The following describes operations and effects of the present embodiment. A tooth breakage might occur in the toothed belt 60 due to deterioration or the like of the toothed belt 60. When the toothed belt 60 has a tooth breakage, the toothed belt 60 races, so that power of the toothed belt 60 does not reach the oil pump 30. On this account, the oil is not discharged from the oil pump 30, so that pressure pulsations of the oil cannot be generated. Accordingly, as illustrated in FIG. 4, in the time series of the time fluctuations of the hydraulic pressure S detected by the hydraulic pressure sensor 50, originally, no time fluctuation of the hydraulic pressure S appears between time t1 and time t2 that are timings at which a time fluctuation of the hydraulic pressure S is to occur. On this account, the frequency of time fluctuations of the hydraulic pressure S between time t1 and time t2 deviates from the frequency of time fluctuations of the hydraulic pressure S to be obtained at the time when the toothed belt 60 does not have a tooth breakage and the oil is discharged from the oil pump 30 normally in a period between time t1 to time t2. By use of such a feature, the actual value Z1 for the frequency of pressure pulsations of the oil is compared with the theoretical value Z2 in the tooth breakage detection process. When the actual value Z1 greatly deviates from the theoretical value Z2, the abnormality of the toothed belt 60 is detected, so that the occurrence of a tooth breakage in the toothed belt 60 is detected.

Here, as one of the methods for detecting deterioration of the toothed belt 60, there is such a method that, when the hydraulic pressure decreases due to stop of the rotation of the oil pump 30, it is detected that the toothed belt 60 has been cut, that is, the toothed belt 60 has deteriorated. However, in this case, at the point of time when the deterioration of the toothed belt 60 is detected, the oil pump 30 has already stopped, so that a period during which no oil is pumped is generated during the operation of the internal combustion engine 10. In this regard, by use of the tooth breakage detection process of the present embodiment, a tooth breakage of the toothed belt 60 can be detected. Under the state where the toothed belt 60 has a tooth breakage, a suitable deterioration occurs in the toothed belt 60, so there is a probability that the toothed belt 60 will be cut in the near future. That is, in the present embodiment, by detecting a tooth breakage of the toothed belt 60, it is possible to detect deterioration of the toothed belt 60 at a stage before the toothed belt 60 is cut.

In the meantime, at the time when the actual value Z1 for the frequency of pressure pulsations of the oil is calculated, it is considered that the number of peaks at which the hydraulic pressure S shifts from increase to decrease is calculated in the time series of the time fluctuations of the hydraulic pressure S after the filtering, and the number of peaks is divided by a time width of the time series. However, in this method, even in a case where a time series including a period during which no oil is discharged from the oil pump 30 is a target, if the number of peaks is large relative to the time width of the time series, a difference between the actual value Z1 and the theoretical value Z2 becomes small. Accordingly, a tooth breakage of the toothed belt 60 may not be detected. Further, if the rotational speed Ne of the crankshaft 12 changes within the time width of the time series, the theoretical value Z2 may not be determined appropriately.

In this regard, in the above configuration, the actual value Z1 for the frequency of pressure pulsations of the oil is calculated based on two adjacent peak times of the hydraulic pressure in the time series of the time fluctuations of the hydraulic pressure S. On this account, the beginning and end of a period during which no oil is discharged from the oil pump 30 are regarded as the two peak times, so that a frequency targeted to only the period during which no oil is discharged from the oil pump 30 can be calculated as the actual value Z1. Accordingly, the difference between the actual value Z1 and the theoretical value Z2 becomes large, thereby making it possible to more surely detect a tooth breakage of the toothed belt 60. Further, it is hard to imagine such a situation that the rotational speed Ne of the crankshaft 12 greatly changes between the two peak times of the hydraulic pressure. On this account, the theoretical value Z2 can be determined appropriately.

Further, in the above configuration, by performing the filtering on the time series of the time fluctuations of the hydraulic pressure S, a fluctuation within a period shorter than the pressure pulsation of the oil is removed, and then, the actual value Z1 for the frequency of pressure pulsations of the oil is calculated. Accordingly, it is possible to prevent such a situation that a peak different from a peak caused due to a pressure pulsation of the oil is specified by mistake as the peak caused due to the pressure pulsation of the oil.

Further, in the above configuration, in the time series of the time fluctuations of the hydraulic pressure S, a peak time is specified by excluding a fluctuation with a peak value that is lower than the average value of a plurality of peak values in the time series. In a case where the toothed belt 60 has a tooth breakage, when a part where the tooth breakage occurs approaches the pump pulley 42 and the power of the toothed belt 60 does not reach the pump pulley 42, the pump pulley 42 (the inner rotor 34) can rotate by inertia. In such a case, the discharge pressure of the oil decreases along with a decrease of the rotational speed of the inner rotor 34, so that the peak value of the pressure pulsation of oil might also become small. As described above, by specifying the peak time with the average value being taken as a threshold, a fluctuation of the hydraulic pressure S when the discharge pressure of the oil decreases is excluded at the time of specifying the peak time. Accordingly, it is possible to prevent such a situation that a fluctuation of the hydraulic pressure S in a state where the power of the toothed belt 60 does not normally reach the oil pump 30 due to a tooth breakage of the toothed belt 60 is regarded by mistake as a pressure pulsation of the oil at the time when the power of the toothed belt 60 reaches the oil pump 30 normally.

Note that the present embodiment can be carried out with some modifications like Modification 1 to Modification 15 as follows. The present embodiment and the following modifications can be carried out in combination as long as they do not cause any technical inconsistencies.

As Modification 1 of the above embodiment, in terms of the process of step S180, instead of or in addition to turning on the notification lamp, information indicating that the toothed belt 60 has an abnormality may be stored in the storage portion of the electronic control unit 70. In a case where the information is stored in the storage portion of the electronic control unit 70 as such, an operator can grasp the presence or absence of an abnormality by reading data at a maintenance factory or the like, for example. Further, instead of or in addition to notifying the abnormality, the driving of the internal combustion engine 10 may be stopped.

As Modification 2, in terms of the process of step S150, the allowable value to allow the theoretical value Z2 to have a width is not limited to the example of the above embodiment. The allowable value should have a magnitude that can cover a deviation of the actual value Z1 from the theoretical value Z2, the deviation being caused due to a deviation of the hydraulic pressure S detected by the hydraulic pressure sensor or a deviation in calculation at the time of calculating the actual value Z1.

As Modification 3, in terms of the process of step S130, the threshold to exclude a fluctuation of the hydraulic pressure S at the time when a peak value of the hydraulic pressure S is relatively low from specification of a peak time is not limited to the example of the above embodiment. In the time series of the time fluctuations of the hydraulic pressure S, the threshold should have a magnitude that can separate a pressure pulsation of the oil at the time when the power of the toothed belt 60 normally reaches the oil pump 30, from a fluctuation of the hydraulic pressure S at the time when the power of the toothed belt 60 does not normally reach the oil pump 30.

As Modification 4, in terms of the process of step S130, in the time series of the time fluctuations of the hydraulic pressure S detected by the hydraulic pressure sensor 50, the peak time may be a time when the hydraulic pressure S shifts from decrease to increase.

As Modification 5, in terms of the process of step S130, in the time series of the time fluctuations of the hydraulic pressure S detected by the hydraulic pressure sensor 50, a time when the hydraulic pressure S shifts from increase to decrease may be assumed as a first peak value, a time when the hydraulic pressure S shifts from decrease to increase may be assumed as a second peak value, and the actual value Z1 may be calculated based on a time interval between the first peak time and the second peak time adjacent to each other. In this case, an inverse of a time width obtained by doubling the time interval between the first peak time and the second peak time adjacent to each other may be calculated as the actual value Z1.

As Modification 6, in terms of the process of step S140, the calculation method of the actual value Z1 is not limited to the method in which the actual value Z1 is calculated based on the time interval between the peak times. As the calculation method of the actual value Z1, a method for counting the number of peaks in a time series of the time fluctuations of the hydraulic pressure S within a given time interval may be employed. In this case, in the time series read in step S110, by performing adjustment such as shortening of a time range to specify a peak of the hydraulic pressure S, a reduction of the difference between the actual value Z1 and the theoretical value Z2 when the toothed belt 60 has a tooth breakage can be avoided. Further, the theoretical value Z2 can be determined appropriately in such a manner that a time range in which the rotational speed Ne of the crankshaft 12 is constant, like a case where the internal combustion engine 10 is in an idle state, is set as a time range to specify a peak of the hydraulic pressure S.

As Modification 7, the frequency map for use in step S120 and step S150 may be a map indicating, by a relational expression, the relationship between the rotational speed Ne of the crankshaft 12 and the theoretical value Z2 for the frequency of pressure pulsations of the oil.

As Modification 8, in terms of the process of step S120, it is not necessary to perform the filtering, and therefore, the filtering may not be performed. However, it is preferable to perform the filtering to remove noises.

As Modification 9, in terms of the process of step S120, a high-pass filter may be applied to the time series of the time fluctuations of the hydraulic pressure S so as to remove fluctuations of frequencies lower than the theoretical value Z2.

As Modification 10, an execution condition of the tooth breakage detection process may be determined. That is, the tooth breakage detection process may be executed under a predetermined operating state of the internal combustion engine 10. For example, the tooth breakage detection process may be executed with the proviso that the internal combustion engine 10 is in an idle state.

As Modification 11, a time range for data of the hydraulic pressure S to be stored in the electronic control unit 70 as the time series is not limited to the example of the above embodiment. The time range should have a length with which the actual value Z1 can be calculated. For example, in the above embodiment, the actual value Z1 is calculated based on two latest peak times. Accordingly, the time range should be a time range including at least two latest peak times.

As Modification 12, the number of the teeth 14a of the crank pulley 14 may be different from the number of the teeth 42a of the pump pulley 42. The diameter of the addendum circle of the crank pulley 14 may be different from the diameter of the addendum circle of the pump pulley 42.

As Modification 13, the number of the teeth 34a of the inner rotor 34 and the number of the teeth 36a of the outer rotor 36 in the oil pump 30 may be changed. The number of the teeth 34a of the inner rotor 34 should be smaller than the number of the teeth 36a of the outer rotor 36.

As Modification 14, an output shaft configured to provide rotation power to the toothed belt 60 is not limited to the crankshaft 12. For example, an electric motor is provided in the internal combustion engine 10. Then, a pulley for an external-gear-type motor is attached to a rotating shaft of the electric motor, and the toothed belt 60 is wound around the pulley for the motor and the pump pulley 42. The toothed belt may be rotated by rotation of the electric motor, so as to rotate the pump pulley 42. In this case, the rotating shaft of the electric motor serves as the output shaft.

As Modification 15, the configuration of the internal combustion engine 10 is modifiable, and therefore, the housing 32 of the oil pump 30 may be placed in the chain chamber K, for example. The number of the cylinders 22a may be changed. The oil pan 24 may be configured such that a frame-shaped case constituting an upper part of the oil pan 24 is connected to a box-shaped case constituting a lower part of the oil pan 24.

What is claimed is:

1. A control system for an oil supply mechanism, the oil supply mechanism including
    an oil pump configured to discharge oil by rotational motions of an external-gear-type inner rotor and an internal-gear-type outer rotor driven by meshing with teeth of the inner rotor,
    a hydraulic pressure sensor configured to detect a hydraulic pressure of the oil discharged from the oil pump,
    a drive shaft connected to a rotation center of the inner rotor,
    an external-gear-type pump pulley attached to the drive shaft,
        a toothed belt wound around the pump pulley and configured such that teeth meshing with teeth of the pump pulley project from an inner peripheral surface of the toothed belt, and
    an output shaft around which the toothed belt is wound, the output shaft being configured to rotate the toothed belt,
    the control system comprising:
        an electronic control unit configured to detect an abnormality of the toothed belt based on a comparison result between an actual value and a theoretical value that are frequencies of pressure pulsations of the oil, the actual value being calculated based on time fluctuations of the hydraulic pressure detected by the hydraulic pressure sensor, and the theoretical value being calculated based on a rotational speed of the output shaft and the number of the teeth of the inner rotor.

2. The control system according to claim 1, wherein the electronic control unit is configured to determine the abnormality based on whether or not the actual value falls within a range between a maximum value that is larger than the theoretical value only by a predetermined allowable value and a minimum value that is smaller than the theoretical value only by the predetermined allowable value.

3. The control system according to claim 2, wherein the electronic control unit is configured to calculate the actual value after filtering is performed to remove fluctuations of frequencies higher than the theoretical value in a time series of the time fluctuations of the hydraulic pressure detected by the hydraulic pressure sensor.

4. The control system according to claim 1, wherein, when a peak time is a time when the hydraulic pressure shifts from increase to decrease in a time series of the time fluctuations of the hydraulic pressure detected by the hydraulic pressure sensor, the electronic control unit is configured to calculate the actual value based on a time interval between the peak time and another peak time adjacent to the peak time.

5. The control system according to claim 4, wherein the electronic control unit is configured to calculate the actual value after filtering is performed to remove fluctuations of frequencies higher than the theoretical value in a time series of the time fluctuations of the hydraulic pressure detected by the hydraulic pressure sensor.

6. The control system according to claim 1, wherein, when a peak time is a time when the hydraulic pressure shifts from decrease to increase in a time series of the time fluctuations of the hydraulic pressure detected by the hydraulic pressure sensor, the electronic control unit is configured to calculate the actual value based on a time interval between adjacent peak times.

7. The control system according to claim 6, wherein the electronic control unit is configured to calculate the actual value after filtering is performed to remove fluctuations of frequencies higher than the theoretical value in a time series of the time fluctuations of the hydraulic pressure detected by the hydraulic pressure sensor.

8. The control system according to claim 1, wherein, when a first peak time is a time when the hydraulic pressure shifts from increase to decrease and a second peak time is a time when the hydraulic pressure shifts from decrease to increase in a time series of the time fluctuations of the hydraulic pressure detected by the hydraulic pressure sensor, the electronic control unit is configured to calculate the actual value based on a time interval between the first peak time and the second peak time adjacent to each other.

9. The control system according to claim 8, wherein the electronic control unit is configured to calculate the actual value after filtering is performed to remove fluctuations of frequencies higher than the theoretical value in a time series of the time fluctuations of the hydraulic pressure detected by the hydraulic pressure sensor.

* * * * *